Jan. 31, 1961  R. L. HAUSER  2,969,779
INTERNAL COMBUSTION ENGINE CRANKSHAFT SEALING MEANS
Filed Dec. 30, 1959

INVENTOR.
BY Robert L. Hauser
L. D. Burch
ATTORNEY

United States Patent Office 2,969,779
Patented Jan. 31, 1961

2,969,779

INTERNAL COMBUSTION ENGINE CRANKSHAFT SEALING MEANS

Robert L. Hauser, Pontiac, Mich., assignor to General Motors Corporation, Detroit, Mich., a corporation of Delaware Filed Dec. 30, 1959, Ser. No. 862,881

3 Claims. (Cl. 121—194)

This invention relates to bearings for the crankshafts of internal combustion engines, particularly to means for sealing the end bearings of the crankshafts that project outwardly between parts of the crankcase and the oil pan for the engine.

In internal combustion engines, particularly engines employed in driving trucks, it is difficult to make an end bearing seal for the crankshaft that will not leak oil. The seal around the crankshaft is usually on an extension of the bearing supporting the end of the shaft that projects outwardly of the crankcase. This end of the shaft tends to vibrate beyond the bearing and in the region where the bearing extension supports the seal. This vibration tends to injure the bearing and the seal, and particularly to cause the seal to leak oil from the crankcase of the engine.

It is now proposed to stiffen the end bearing by applying additional bolts to the bearing cap and by providing additional sealing to prevent leakage of oil through and around the additional bolts.

In the drawing:

Figure 2 is taken substantially in the plane of line 2—2 on Figure 1 looking in the direction of the arrows.

Figure 3 is taken substantially in the plane of line 3—3 on Figure 1 looking in the direction of the arrows.

Figure 1:
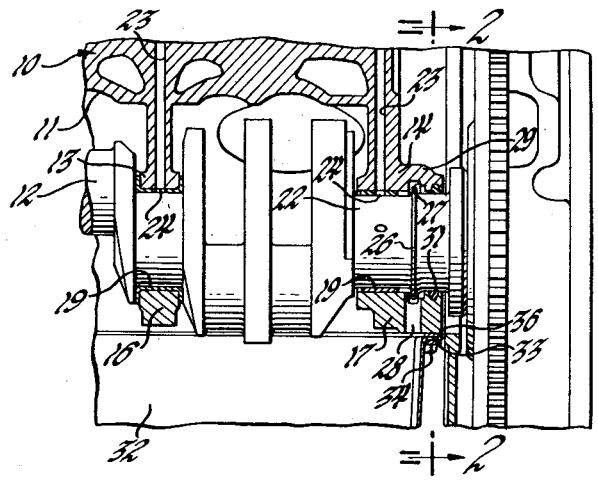
Figure 1 is a fragmentary longitudinal sectional view of an internal combustion engine having a crankshaft end bearing embodying the invention.
Figure 2:
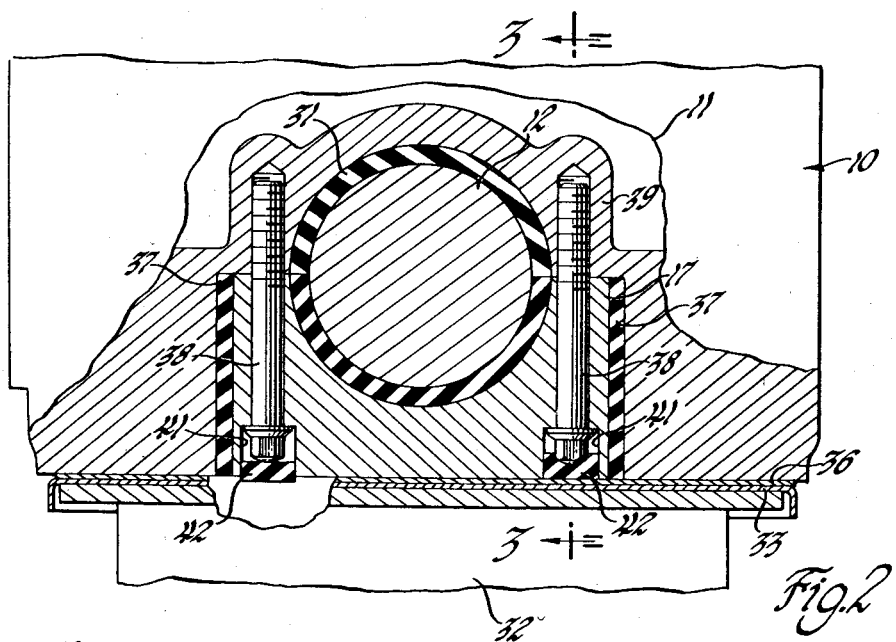
Figure 2 is an enlarged cross-sectional view of the crankshaft and bearing disclosed by Figure 1.
Figure 3:
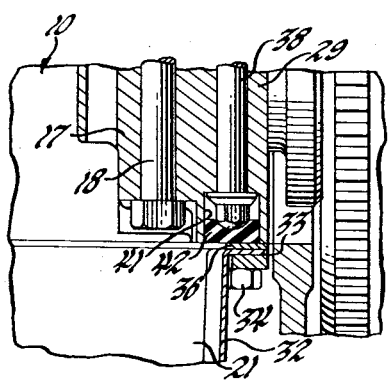
Figure 3 is an enlarged fragmentary longitudinal sectional view taken through a different part of the bearing.

The engine 10 is a piston in cylinder type internal combustion engine for automotive and other uses. The engine employs a cast or other suitable cylinder block 11 supporting a crankshaft 12 in intermediate bearings 13 and end bearings 14. The intermediate and end bearings include bearing caps 16 and 17, respectively, that are usually bolted to the crankcases by bolts on opposite sides of each crankshaft journal, one of the bolts for the end bearing cap 17 being indicated at 18. The bolts 18 secure the parts of the bearing together on bushings 19 within which the journals of the crankshaft are rotatably supported. It will be noted from Figure 3 that the bolts 18 for the end bearing 14 are within the crankcase compartment 21 where the lubricating oil for the engine is contained. The bolts 18 for the rear bearing 14 are disposed between the ends of a bushing 19 so as to directly support the load imposed on the bushing by the end journal 22 of the crankshaft 12. The bushings 19 for the bearings 13 and 14 are usually lubricated by passages 23 connected to the oil pump of the engine where oil under pressure is supplied to openings or grooves 24 in the bushings 19. The oil so supplied tends to be forced out of the bushings 19 in opposite directions toward the ends of the bushings. The oil escaping from the outer end of the bushings 19 and the end bearing 14 is thrown outwardly by an oil slinger 26 on the end of the crankshaft 12 beyond the journal 22. The oil is collected in an annular groove 27 in which the oil slinger 26 is located. The oil collected by the groove 27 is drained into the crankcase by a downwardly extending passage 28. The groove 27 and the passage 28 are formed in an extension 29 of the bearing 14 forming a part through which the end of the crankshaft 12 beyond the journal 22 projects outwardly of the crackcase 21. A seal 31 is disposed in a groove outwardly of the groove 27 in the extension 29 to resiliently engage the outer end of the crankshaft to prevent leakage from the crankcase of any oil that may escape beyond the oil slinger 26. An oil pan 32 has outwardly projecting flanges 33 that are secured to the lower edges of the block 11 and bearing cap 18 by a plurality of bolts indicated at 34. The flanges may be secured against the edges of the block and the bearing cap on a gasket indicated at 36. The gasket 36 normally prevents leakage of oil outwardly of the crankcase 21 between the flange and the edge of the block and the bearing cap. The bearing cap in the present instance fits a slot with parallel edges that is formed in the rear wall of the block and beneath the lower half of the bearing 14. The opposite edges of the slot and the opposite edges of the bearing cap 17 may be oppositely grooved to receive sealing wedges 37 that may be driven upwardly into the grooves from beneath the block and the bearing cap. It is proposed to stiffen the bearing 14 by employing an additional pair of bolts indicated at 38. The bolts 38 extend through parallel openings adjacent the ends of the bearing cap and are secured in threaded openings formed in the bearing support 39. It is proposed to locate the bolts 38 as near as possible to the seal 31 so as to rigidly secure the parts of the extension together opposite the seal. In this location it will be apparent that the heads of the bolts 38 will be directly above the oil pan flange 33 where the oil pan flange extends beneath the bearing cap 17. To prevent the heads of the bolts from interfering with the flange 33 it is proposed to locate the heads of the bolts in recesses 41 that extend upwardly in the bearing cap 17 from the lower edge. With such construction there might be leakage of oil between the bearing support and the bearing cap and downwardly around the bolts 38 and through the recesses 41. This leakage of oil might fill the openings and the recesses and exert a pressure on the gasket 36. Since the recesses 41 are about as wide as the flange 33 it is possible that some of this oil might leak outwardly of the crankcase through the narrow parts of the gasket between the outer edges of the recesses 41 and the outer edge of the flange 33. In order to prevent this it is proposed to make the recesses 41 receiving the heads of the bolts 38 deeper than necessary and deep enough to receive compressible disks 42 between the bolt heads and the gasket 36. The disks 42 may be made of neoprene rubber or other suitable elastic material. It is also proposed to make the disks 42 thicker than the spaces between the heads of the bolts 38 and the gasket 36 so that the disks may be distorted and compressed around the bolt heads to create a pressure seal against the sides of the recesses 41 completely around the recesses below the bolt heads. The disks 42 also may be made slightly larger than the recesses 41 so that they may be compressed into the recesses when the oil pan is removed so that they will remain in the recesses until the oil pan can be secured to the lower edges of the block and against the lower edge of the bearing cap 17. When the oil pan is secured in position by the bolts, the flange 33 and the gasket 36 will compress the disks around the bolt heads to create the sealing pressure required.

I claim:

1. A main bearing seal for the crankshaft of an internal combustion engine having a crankcase formed to provide a bearing including a bearing cap and in which bearing a journal of said crankshaft is supported and through which the driving end of said crankshaft projects outwardly of said crankcase through a seal supporting extension of said bearing and in which engine the lower part of said crankcase is closed by an oil pan having a flange secured to the lower edges of said crankcase and said bearing cap and in which engine bolts are employed to secure said bearing cap to said crankcase opposite said flange and comprising, a rotary seal engaging the end of said crankshaft outwardly of said bearing but within said extension, another pair of bolts extending through openings in said bearing cap on opposite sides of said seal and having the heads of said bolts disposed in recesses in said flange supporting edge of said bearing cap and in directly opposed relation to said oil pan flange, and means within said recesses and engaging and being compressed between said heads and said flange and sealing said recesses against the leakage of oil through said openings and said recesses and between said lower edge of said bearing cap and said flange.

2. A main bearing seal for the crankshaft of an internal combustion engine having a crankcase formed to provide a bearing including a bearing cap and in which bearing a journal of said crankshaft is supported and through which the driving end of said crankshaft projects outwardly of said crankcase through a seal supporting extension of said bearing and in which engine the lower part of said crankcase is closed by an oil pan having a flange secured against a gasket to the lower edges of said crankcase and said bearing cap and in which engine bolts are employed to secure said bearing cap to said crankcase opposite said flange and comprising, a rotary seal engaging the end of said crankshaft outwardly of said bearing but within said extension, another pair of bolts extending through openings in said bearing cap on opposite sides of said seal and having the heads of said bolts disposed in recesses in said flange supporting edge of said bearing cap and in directly opposed relation to said oil pan flange, and means within said recesses and engaging and being compressed between said heads and said gasket and sealing said recesses against the leakage of oil through said openings and said recesses and between said lower edge of said bearing cap and said gasket.

3. A main bearing seal for the crankshaft of an internal combustion engine having a crankcase formed to provide a bearing including a bearing cap and in which bearing a journal of said crankshaft is supported and through which the driving end of said crankshaft projects outwardly of said crankcase through a seal supporting extension of said bearing and in which bearing said bearing cap is sealed in a slot extending inwardly from the lower edge of said crankcase and in which engine the lower part of said crankcase is closed by an oil pan having a flange secured against a gasket to the lower edges of said crankcase and said bearing cap and in which engine bolts are employed to secure said bearing cap to said crankcase opposite said flange and comprising, a rotary seal engaging the end of said crankshaft outwardly of said bearing but within said extension, another pair of bolts extending through openings in said bearing cap on opposite sides of said seal and having the heads of said bolts disposed in recesses in said flange supporting edges of said bearing cap and in directly opposed relation to said oil pan flange, and means within said recesses and engaging and being compressed between said heads and said gasket and sealing said recesses against the leakage of oil through said openings and said recesses and between said lower edges of said bearing cap and said gasket.

References Cited in the file of this patent

UNITED STATES PATENTS

| | | |
|---|---|---|
| 2,226,595 | Swenson | Dec. 31, 1940 |
| 2,632,340 | Dolza et al. | Mar. 24, 1953 |
| 2,657,675 | McGowen | Nov. 3, 1953 |
| 2,746,429 | Vann | May 22, 1956 |